United States Patent
Keefover et al.

(10) Patent No.: US 11,267,349 B2
(45) Date of Patent: Mar. 8, 2022

(54) THREE-WAY TRANSFORMER FOR POWER CONVERSION IN ELECTRIC VEHICLES

(71) Applicant: BorgWarner Inc., Auburn Hills, MI (US)

(72) Inventors: Robert Keefover, Lake Orion, MI (US); Nicola Rosano, Ravenna (IT)

(73) Assignee: BORGWARNER, INC., Auburn Hills, MI (US)

( * ) Notice: Subject to any disclaimer, the term of this patent is extended or adjusted under 35 U.S.C. 154(b) by 153 days.

(21) Appl. No.: 16/724,561

(22) Filed: Dec. 23, 2019

(65) Prior Publication Data
US 2021/0188107 A1    Jun. 24, 2021

(51) Int. Cl.
| | |
|---|---|
| B60L 53/14 | (2019.01) |
| B60L 53/20 | (2019.01) |
| B60L 53/30 | (2019.01) |
| B60L 50/60 | (2019.01) |
| H02J 7/00 | (2006.01) |
| H01F 27/32 | (2006.01) |
| B60L 50/51 | (2019.01) |
| B60L 53/60 | (2019.01) |

(52) U.S. Cl.
CPC ............... *B60L 53/14* (2019.02); *B60L 50/51* (2019.02); *B60L 53/20* (2019.02); *B60L 53/30* (2019.02); *B60L 53/60* (2019.02); *H01F 27/32* (2013.01); *H02J 7/007* (2013.01); *B60L 2210/40* (2013.01); *B60L 2220/14* (2013.01)

(58) Field of Classification Search
CPC .......... B60L 53/14; B60L 53/20; B60L 53/30; B60L 53/60; B60L 50/51; B60L 2220/14; B60L 2210/40; H01F 27/32; H02J 7/007; H02J 7/00
See application file for complete search history.

(56) References Cited

U.S. PATENT DOCUMENTS

| | | | |
|---|---|---|---|
| 5,657,942 A * | 8/1997 | Faulk | H01F 41/041 140/92.2 |
| 2001/0030307 A1* | 10/2001 | Bergstrom | H01F 7/1638 251/129.15 |
| 2008/0084714 A1* | 4/2008 | Kawasaki | H02M 3/33576 363/21.01 |
| 2019/0027301 A1* | 1/2019 | Lee | H01F 17/062 |
| 2020/0212816 A1* | 7/2020 | Sun | H02M 3/33584 |

OTHER PUBLICATIONS

Yichao Tang, et al., "A Bridgeless Totem-pole Interleaved PFC Converter for Plug-In Electric Vehicles", 2016 IEEE Applied Power Electronics Conference and Exposition (APEC), dated Mar. 2016, pp. 440-445.

* cited by examiner

*Primary Examiner* — Vuthe Siek
(74) *Attorney, Agent, or Firm* — Reising Ethington P.C.

(57) ABSTRACT

A common transformer used with an electric vehicle that includes a transformer core configured to receive electrical windings from a plurality of electrical circuits; an alternating current (AC) synchronous rectification (SR) circuit electrically connected to the transformer core via an AC winding; a high-voltage SR DC circuit electrically connected to the transformer core via a high-voltage DC winding; and a low-voltage DC SR circuit electrically connected to the transformer core via a low-voltage DC winding.

18 Claims, 7 Drawing Sheets

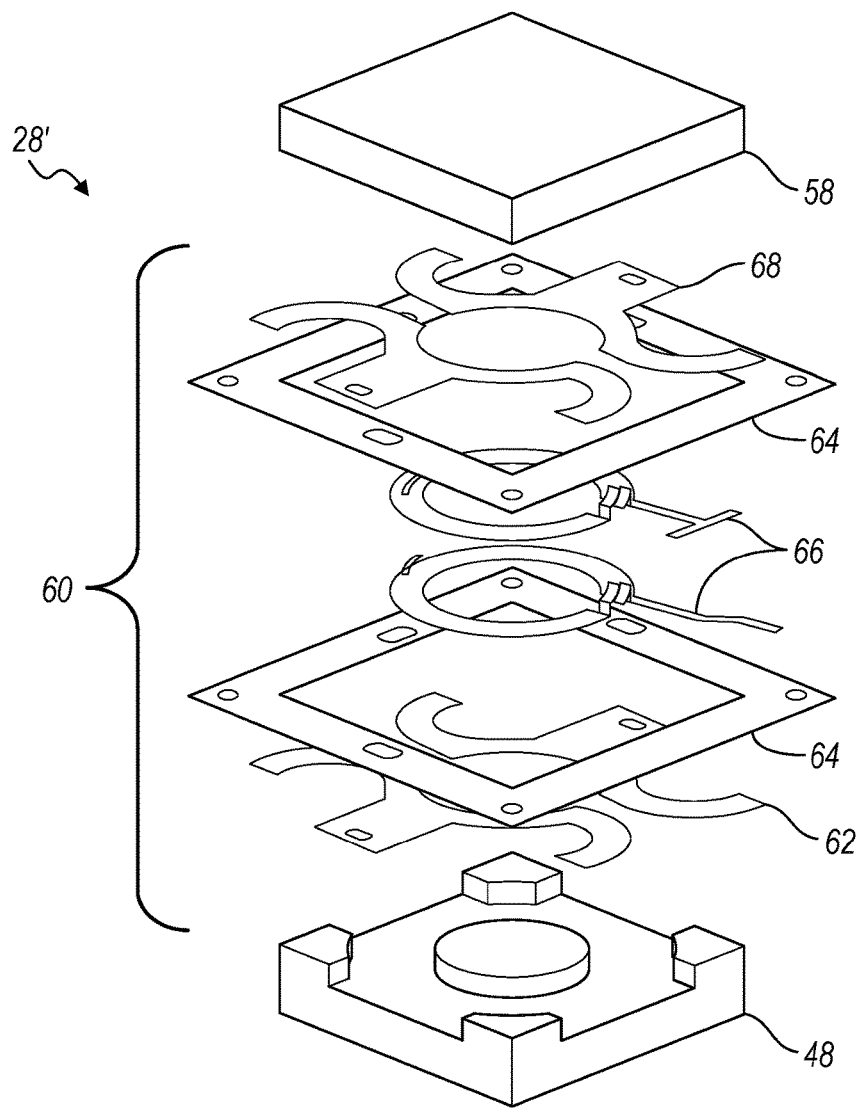
FIG. 13
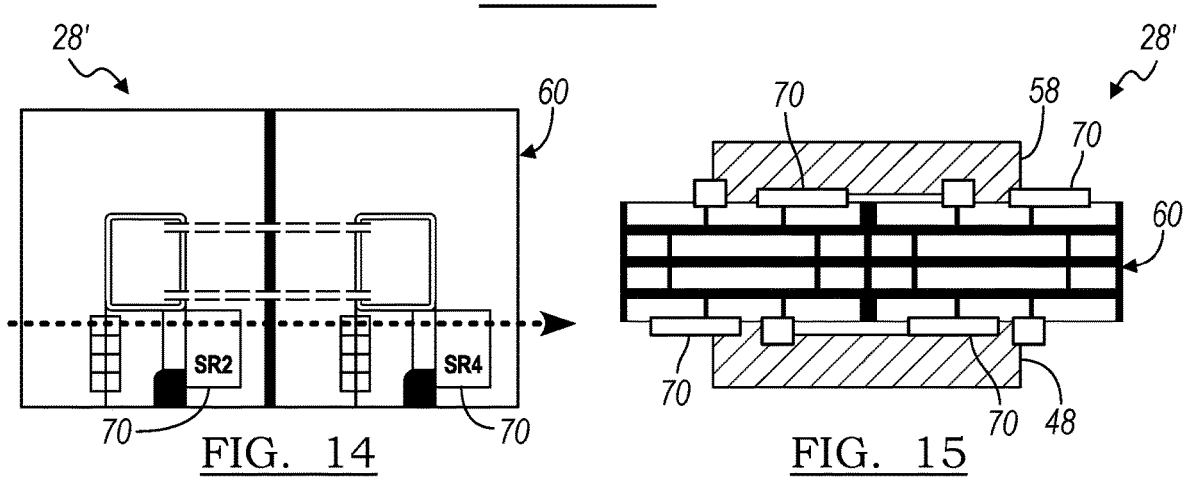
FIG. 14
FIG. 15

THREE-WAY TRANSFORMER FOR POWER CONVERSION IN ELECTRIC VEHICLES

TECHNICAL FIELD

The present application relates to electric vehicles and, more particularly, to on-board charging of electric vehicles.

BACKGROUND

Electrical systems in vehicles powered by internal combustion engines (ICEs) typically use a battery to facilitate ignition and provide electrical power to vehicle accessories. A level of battery charge may be maintained by an alternator that is mechanically coupled to an output of the ICE. As the ICE operates, the output turns a rotor of the alternator thereby inducing the flow of electrical current through windings in a stator. Passive electrical components are implemented as voltage regulators to apply the alternating current (AC) generated by the alternator to the direct current (DC) vehicle electrical system and battery.

Modern vehicles are increasingly propelled by one or more electrical motors powered by higher-voltage batteries. These vehicles are often referred to as electric vehicles (EV) or hybrid-electric vehicles (HEV) and include an on-board vehicle battery charger for charging the batteries that power the electrical motors. These batteries may have a significantly higher voltage than those used with vehicles not powered by electrical motors. Unlike batteries used with vehicles solely powered by an ICE, the on-board vehicle battery charger regulates incoming AC electrical power received by the EV from EV service equipment, such as a charging station, fixed to a residence or a particular geographic location. And in addition to the incoming AC electrical power from the EV service equipment to the on-board vehicle charger, modern vehicles are increasingly able to return electrical power stored in vehicle batteries to the electrical grid. Further, the on-board vehicle charger can regulate voltage supplied by the vehicle battery, having relatively high voltage, to electrical components on the vehicle that may operate using a relatively lower DC voltage.

SUMMARY

In one implementation, a common transformer used with an electric vehicle includes a transformer core configured to receive electrical windings from a plurality of electrical circuits; an alternating current (AC) synchronous rectification (SR) circuit electrically connected to the inverter core via an AC winding; a high-voltage DC SR circuit electrically connected to the transformer core via a high-voltage DC winding; and a low-voltage DC SR circuit electrically connected to the transformer core via a low-voltage DC winding.

In another implementation, a common transformer used with an electric vehicle includes a transformer core configured to receive electrical windings from a plurality of electrical circuits; an alternating current (AC) synchronous rectification (SR) circuit electrically connected to the transformer core via an AC winding and configured to receive electrical power from an electrical grid; a high-voltage DC SR circuit electrically connected to the transformer core via a high-voltage DC winding and configured to receive electric power from a vehicle battery; and a low-voltage DC SR circuit electrically connected to the transformer core via a low-voltage DC winding.

In yet another implementation, a common transformer used with an electric vehicle includes a transformer core comprising a central post and one or more perimeter posts that are radially outwardly spaced apart from the central post, each of which is configured to receive electrical windings from electrical circuits; an alternating current (AC) synchronous rectification (SR) circuit electrically connected to the central post via an AC winding; a high-voltage DC SR circuit electrically connected to the central post via a high-voltage DC winding; and a low-voltage DC SR circuit electrically connected to all of the perimeter posts via a low-voltage DC winding.

BRIEF DESCRIPTION OF THE DRAWINGS

FIG. 13 is an exploded view of another implementation of a common transformer;

FIG. 14 is a plan view of another implementation of a common transformer; and

FIG. 15 is a cross-sectional view of another implementation of a common transformer.

DETAILED DESCRIPTION

An on-board vehicle battery charger includes a common transformer that electrically connects an Alternating Current (AC) circuit, a high-voltage Direct Current (DC) circuit, and a low-voltage DC circuit on a transformer core permitting the bi-directional flow or induction of electrical current between each of the AC circuit, the higher-voltage DC circuit, and/or the lower-voltage DC circuit based on the induction of electrical current by one circuit winding of another circuit winding. The common transformer electrically connects the three circuits. The common transformer can be implemented as a relatively planar structure that includes electrical components regulating the bi-directional flow of electrical current between the AC circuit, the high-voltage DC circuit, and the low-voltage DC circuit. However, the common transformer could be implemented in other forms that may be non-planar. In one implementation, a transformer core can include a central post and a plurality of perimeter posts that are radially-outwardly spaced from the central post. In another implementation, the common transformer can be implemented within a printed circuit board (PCB) that also carries one or more electrical switches and/or other electrical components used to implement the circuits on an outer surface of the PCB. A particular ratio of wire turns between the AC circuit, the high-voltage DC circuit, and the low-voltage DC circuit can be used to regulate the voltage on each circuit. The ratio can be 16:8:0.25 turns for the AC circuit, the higher-voltage DC circuit, and the lower-voltage DC circuit, respectively. More particularly, the particular ratio can be modified to 16:8:1 by using a single winding that encircles each of four perimeter posts that are radially-spaced from the central post.

Figure 1:
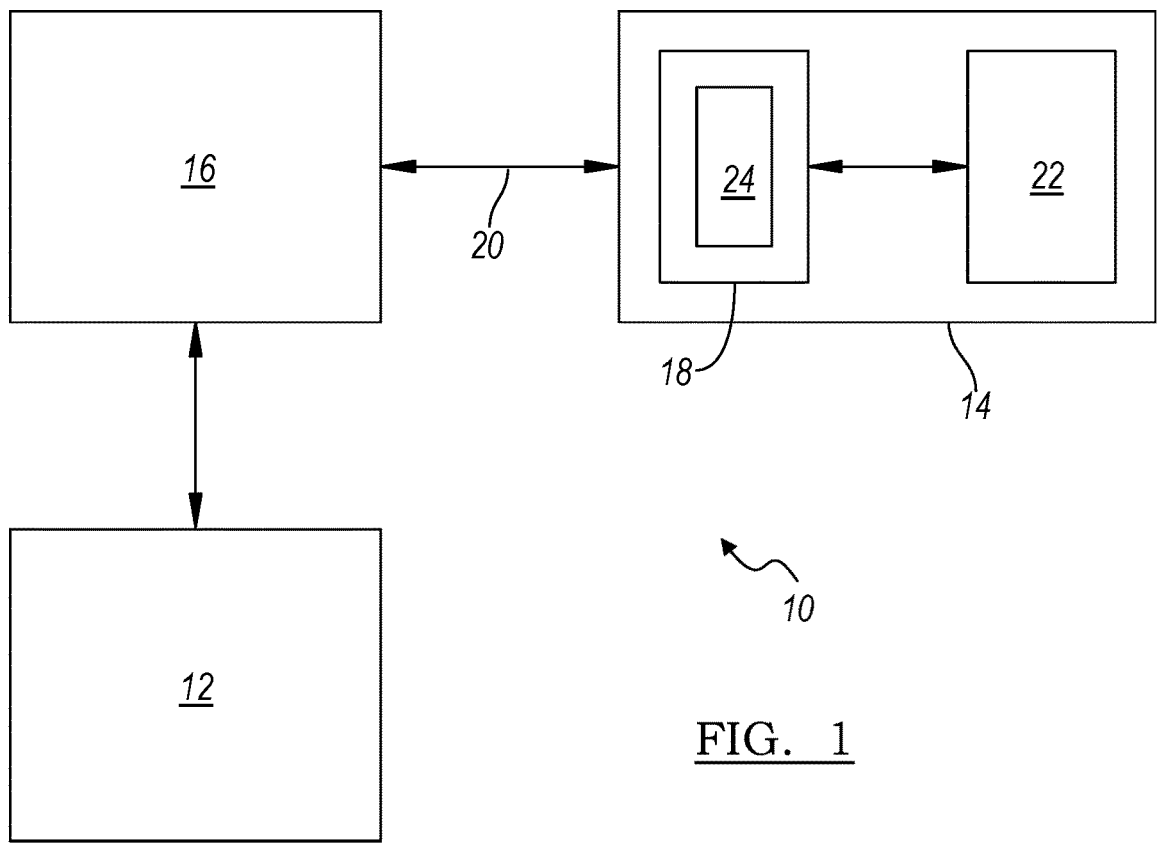
FIG. 1 is a block diagram depicting an implementation of an electrical system including an electrical grid and an electric vehicle.

Turning to FIG. 1, an implementation of an electrical system 10 is shown including an electrical grid 12 and an electric vehicle (EV) 14 that can either receive electrical power from or provide electrical power to the grid 12. The electrical grid 12 can include any one of a number of electrical power generators and electrical delivery mechanisms. Electrical generators (not shown), such as nuclear-, hydraulic-, or wind-powered plants that convert the energy of nuclear fission, flow of water through dams, or wind power of a turbine, create AC electrical power that can then be transmitted a significant distance away from the electrical generator for residential and commercial use. The electrical generator can couple with the electrical grid 12 that transmits the AC electrical power from the electrical generator to an end user, such as a residence or business. As the AC electrical power is provided to the electrical grid 12, the electrical power can exist at a relatively high voltage so that it can be communicated relatively long distances. Once the electrical power reaches a location where it is intended to be used, electrical transformers (not shown) can be used to reduce the voltage level before ultimately being provided to a residence or business. In one implementation, the voltage level of AC electrical power received by the residence or business is 240 volts (V). However, this voltage can be a different value.

EV service equipment 16, also referred to as an electric-vehicle-charging station, can receive AC electrical power from the grid 12 and provide the electrical power to the EV 14. Also, the EV service equipment 16 can receive stored electrical power from a vehicle battery 22 that has been converted from DC to AC electrical power and transfer it to the grid 12. The EV service equipment 16 can be geographically fixed, such as a charging station located in a vehicle garage or in a vehicle parking lot. The terms EV service equipment and charging station will be used interchangeably. The charging station 16 can include an input terminal that receives the AC electrical power from the grid 12 and communicates the AC electrical power to an on-board vehicle battery charger 18 included on the EV 14. An electrical cable 20 can detachably connect with an electrical receptacle on the EV 14 and electrically link the charging station 16 with the EV 14 so that AC electrical power can be communicated between the charging station 16 and the EV 14. The charging station 16 can be classified as "Level 2" EV service equipment that receives 240 VAC from the grid 12 and supplies 240 VAC to the EV 14. One implementation of the charging station 16 is a Siemens VersiCharge™ Residential EV Charging Solution. It is possible the level of AC electrical power input to a charging station and/or the level of AC electrical power output from a charging station is different in other implementations. The term "electric vehicle" or "EV" can refer to vehicles that are propelled, either wholly or partially, by electric motors. EV can refer to electric vehicles, plug-in electric vehicles, hybrid-electric vehicles, and battery-powered vehicles. The vehicle battery 22 can supply DC electrical power, that has been converted from AC electrical power, to the electric motors that propel the EV. The vehicle battery 22 or batteries are rechargeable and can include lead-acid batteries, nickel cadmium (NiCd), nickel metal hydride, lithium-ion, and lithium polymer batteries. A typical range of vehicle battery voltages can range from 200 to 800V of DC electrical power (VDC).

Figure 2:
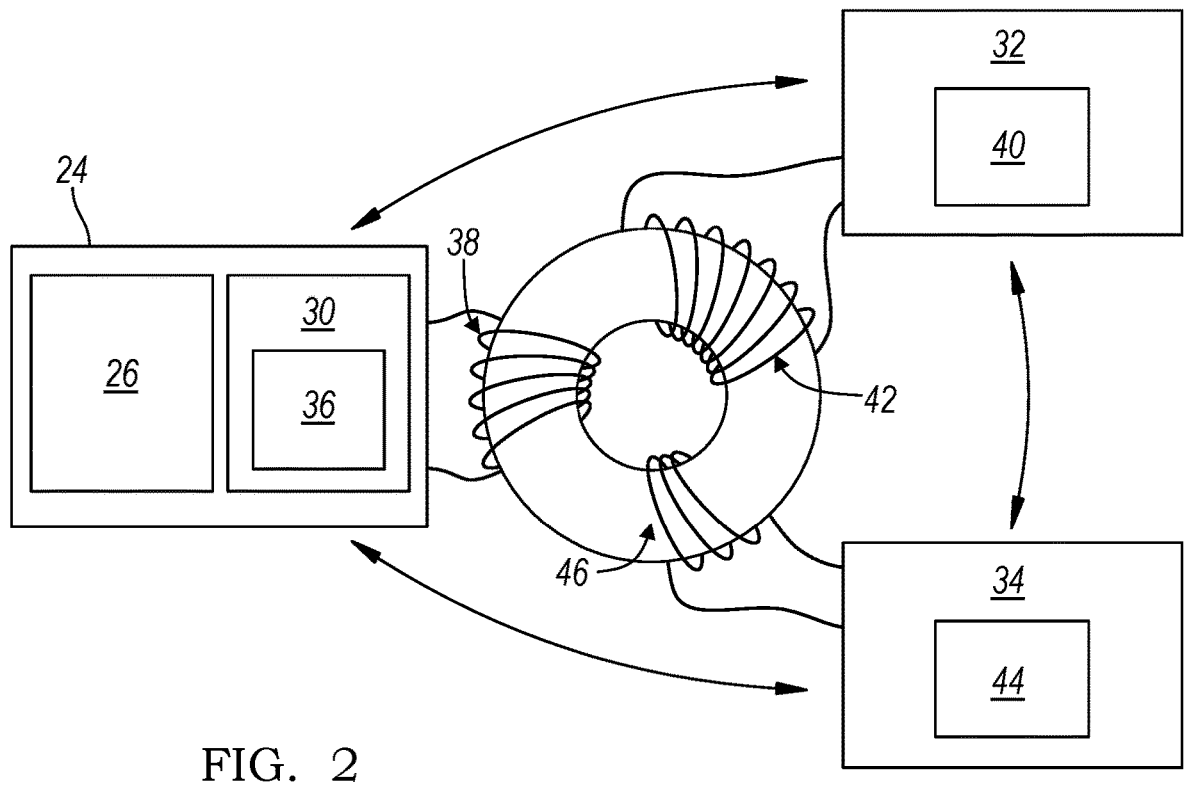
FIG. 2 is a view depicting an implementation of a common inverter.

The on-board vehicle battery charger 18 can be electrically connected to the EV service equipment 16 and communicate electrical power between the vehicle battery 22 and the EV service equipment 16. AC electrical power received from the grid 12 can be converted to DC by the on-board vehicle battery charger 18 that may be located on the EV 14. The on-board vehicle battery charger 18 can include a power factor correction (PFC) module 24 having a switching circuit 26 that converts AC electrical power into DC electrical power as is shown in FIG. 2. In addition, the switching circuit 26 can also act as an inverter that converts DC electrical power into AC electrical power, which can be transmitted outside of the EV 14. Electrical power can be used to refer to electrical current, electrical voltage, or both. The switching circuit 26 can include two actively controlled switches for each phase or leg of an AC circuit (A, B, and C). The actively controlled switches can serve as active rectifiers for incoming AC electrical power. In addition, the switches can work as inverters for converting DC electrical power stored in the vehicle battery 22 into AC electrical power that can be transmitted outside of the EV 14. The first leg (A) includes a first switch and a second switch, the second leg (B) includes a first switch and a second switch, and the third leg (C) includes a first switch and a second switch. The switches included in the switching circuit 26 can be implemented using field effect transistors (FETs), such as metal-oxide-semiconductor field effect transistors (MOSFETs). A microprocessor (not shown) electrically linked to the gate of each switch can control the rectification of incoming AC electrical power as well as the inversion of outgoing DC electrical power. The switches can be wired in parallel with bulk capacitors and a load (not shown), such as the vehicle battery 22.

Turning to FIG. 2, a schematic of a common transformer 28 used with the PFC module 24, an AC circuit 30 included with the PFC module 24, a high-voltage DC circuit 32, and a low-voltage DC circuit 34. The AC circuit 30 includes an AC synchronous rectification (SR) circuit 36 and an AC winding 38. The AC SR circuit 36 can include four switches that are electrically connected to the AC winding 38, which can be wrapped around a portion of a transformer core. The AC SR circuit 36 can be implemented as a power inverter, such as an H bridge. The AC winding 38 can include a specified number of turns around a transformer core and a chosen cross-sectional area, the details of which will be discussed below. The switches of the AC SR circuit 36 can receive DC electrical output from the PFC module 24 and may be selectively opened and closed to induce electrical current flow on the AC winding 38 wrapped around the transformer core. The high-voltage DC circuit 32 can include a high-voltage DC SR circuit 40 that receives electrical power from a DC electrical source, such as the vehicle battery 22, and a high-voltage DC winding 42. A high-voltage DC bus (not shown) can distribute the DC electrical power received from the vehicle battery 22 to various electrical devices, such as an electric motor propelling the EV 12. The high-voltage DC bus can also distribute the electrical power to the high-voltage DC SR circuit 40. The high-voltage DC SR circuit 40 can include four switches that are electrically connected to the high-voltage DC winding 42 wrapped around the transformer core. The high-voltage DC winding 42 has a specified number of turns and chosen cross-sectional area, the details of which will be discussed below. The switches can receive high-voltage DC output from the vehicle battery 22 and may be selectively opened and closed to induce electrical current flow on the high-voltage DC winding 42 wrapped around the transformer core.

The low-voltage DC circuit 34 can include a low-voltage DC bus (not shown) that may distribute the electrical power, ultimately induced by the high-voltage DC circuit 32, to various electrical devices, such as a vehicle infotainment system that provides music or information to vehicle occupants through visual displays and/or speakers. The low-voltage DC circuit 34 can also include a low-voltage DC SR circuit 44 and a low-voltage DC winding 46. The low-voltage DC SR circuit 44 can include four switches that are electrically connected to the low-voltage DC winding 46 wrapped around the transformer core. The low-voltage DC winding 46 has a specified number of turns and cross-sectional area, the details of which will be discussed below. The switches can receive electrical current induced by either the AC SR circuit 36 or the high-voltage DC SR circuit 44 and may be selectively opened and closed to output electrical power to the low-voltage DC bus. The low-voltage DC SR circuit 44 can also induce electrical current flow on the high-voltage DC winding 42 wrapped around the transformer core. The electrical current variously supplied to the AC winding 38, the high-voltage DC winding 42, or the low-voltage DC winding 46 by the PFC module 24, the high-voltage DC circuit 32, or the low-voltage DC circuit 34 may be supplied as alternating current so as to induce the flow of current in windings on the transformer core. For example, the high-voltage DC circuit 32 may receive DC electrical power from the vehicle battery and then convert the DC electrical power to AC electrical power so as to induce AC current flow through the high-voltage DC winding 42.

The switches in the PFC module 24, the AC SR circuit 30, the high-voltage DC SR circuit 40, and/or the low-voltage DC SR circuit 44 can be controlled using a microprocessor to facilitate bi-directional flow of electrical current between the circuits. For example, the PFC module 24 can receive AC electrical power from the electrical grid 12 and, using the AC circuit 30, induce electrical current flow in the high-voltage DC winding 42 to charge the vehicle battery 22. And the high-voltage DC circuit 32 can receive electrical power from the vehicle battery 22 that can be used to induce electrical current in the AC winding 38 to facilitate vehicle-to-grid (V2G) power supply from the EV 14 to the electrical grid 12. Also, the high-voltage DC circuit 32 can receive electrical power from the vehicle battery 22 and induce electrical current flow in the low-voltage DC winding 46 that can ultimately be used to supply low-voltage DC electrical power to vehicle components on the EV 14. The high-voltage DC circuit 32 can receive electrical power from the low-voltage DC circuit 34; electrical current flow can be induced in the high-voltage DC winding 40 by the low-voltage winding 46 that can ultimately be used to supply high-voltage electrical power, such as by providing a high-voltage bus pre-charge. In yet another example, the AC SR circuit 36 can receive electrical power from the electrical grid 12 and induce current in the low-voltage DC winding 46 that can be used to supply low-voltage electrical power to vehicle components on the EV 14. The microprocessor (not shown) can be a separate microprocessor/microcontroller, such as an electronic control unit (ECU), that is electrically connected to the gate of each switch in the PFC module 24, the AC circuit 30, the high-voltage DC circuit 32, and/or the low-voltage DC circuit 34. The microprocessor can be any type of device capable of processing electronic instructions including microprocessors, microcontrollers, host processors, controllers, vehicle communication processors, and application specific integrated circuits (ASICs). It can be a dedicated processor used only to control the circuits or can be shared with other vehicle systems. The microprocessor executes various types of digitally-stored instructions, such as software or firmware programs stored in memory. However, it should be appreciated that other implementations are possible in which at least some of these elements could be implemented together on a printed circuit board.

Figure 3:
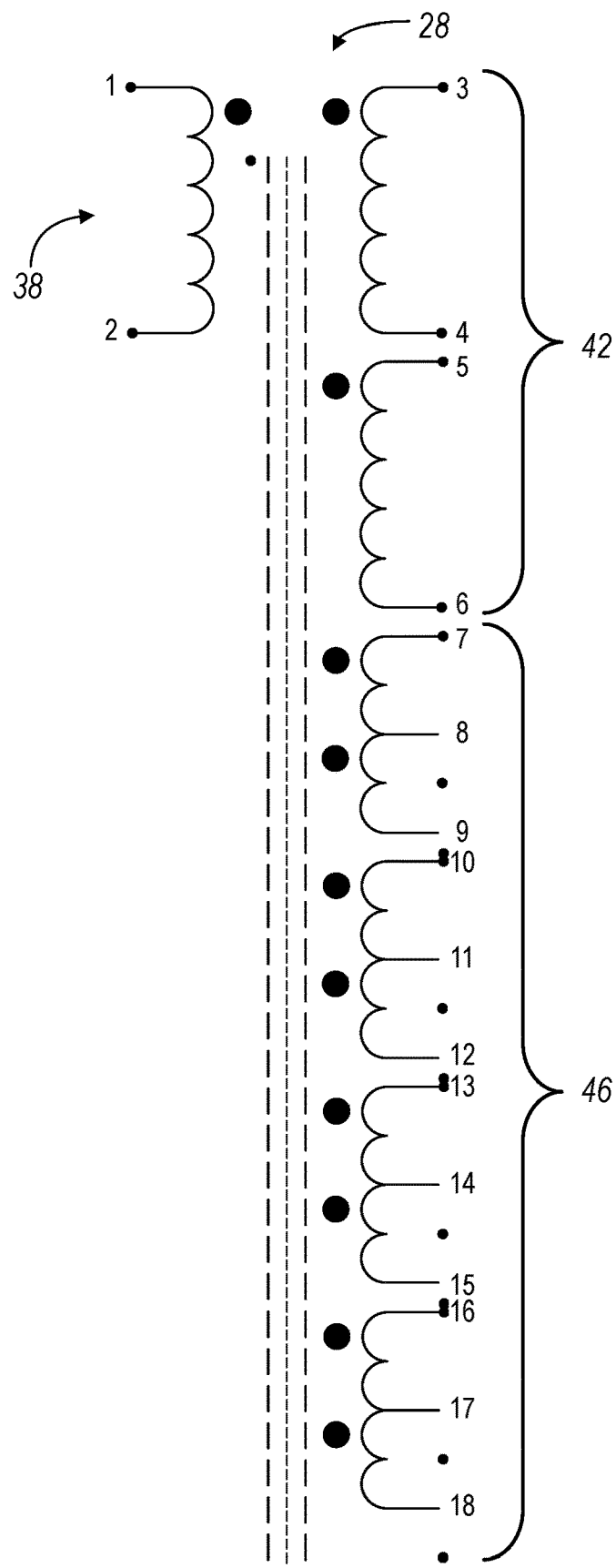
FIG. 3 is a circuit diagram depicting an implementation of a common inverter.
Figure 4:
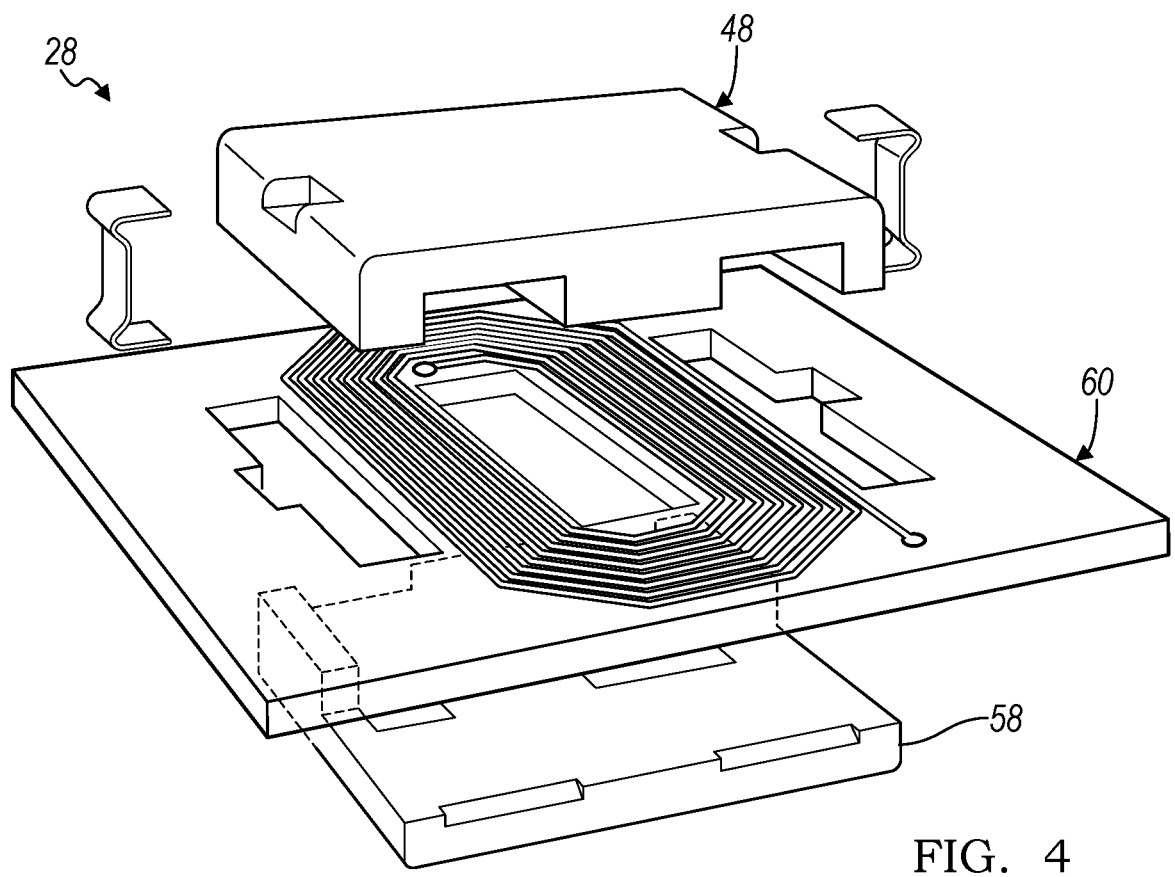
FIG. 4 is a perspective view depicting an implementation of a common inverter.
Figure 5:
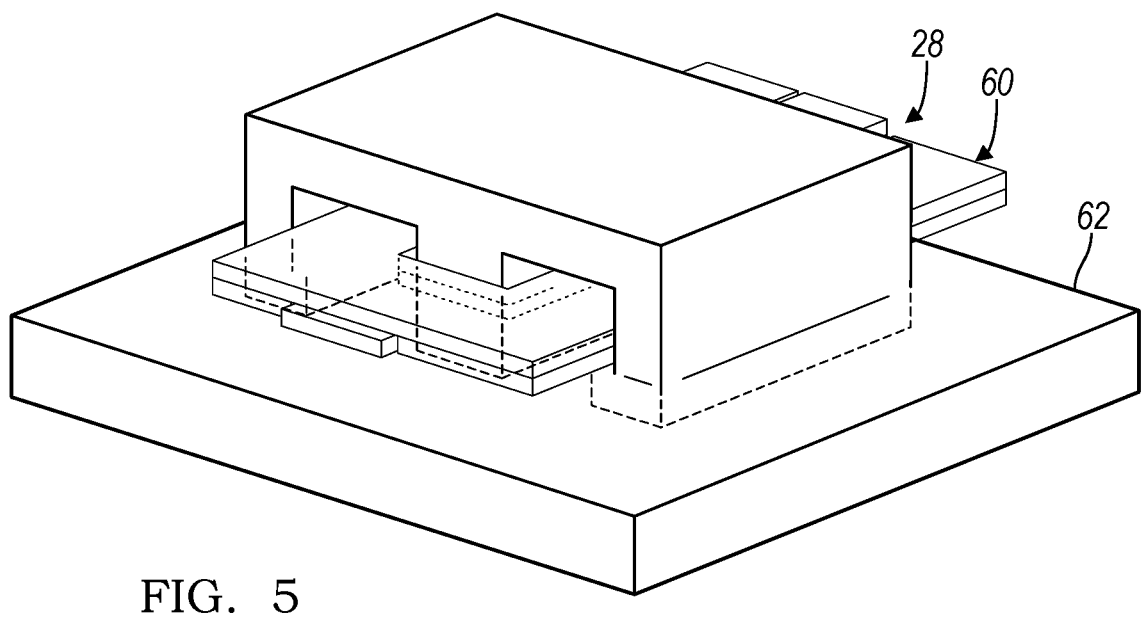
FIG. 5 is a perspective view depicting an implementation of a common inverter coupled to a metal plate.
Figure 6:
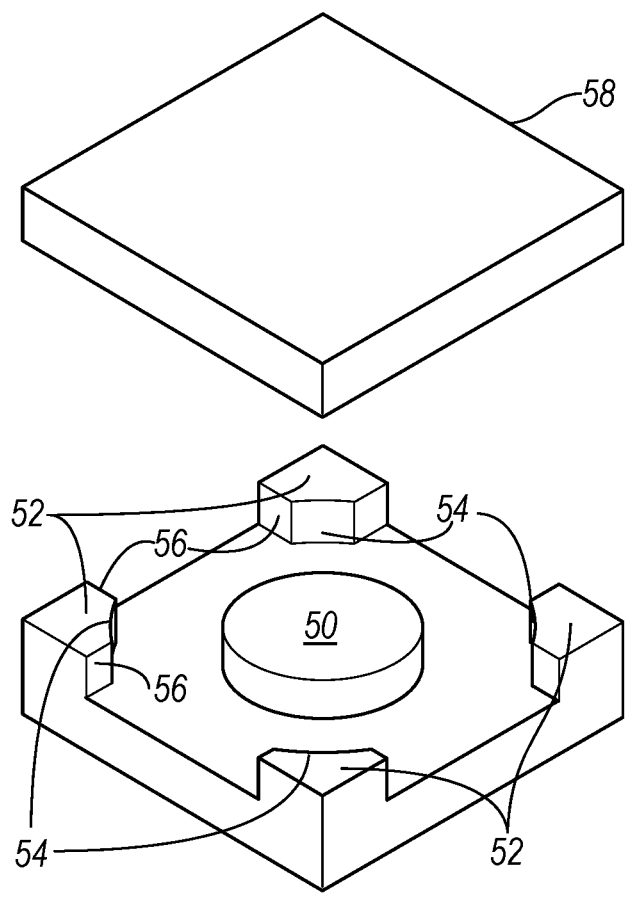
FIG. 6 is an exploded view depicting an implementation of a common inverter.
Figure 7:
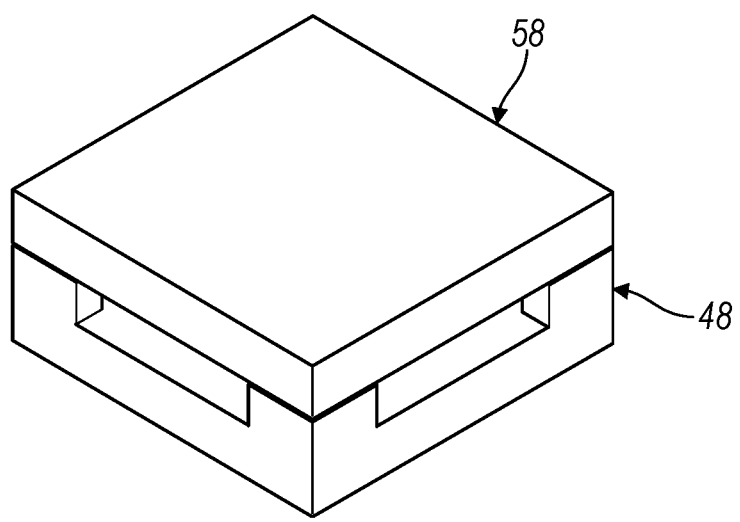
FIG. 7 is a perspective view depicting an implementation of a common inverter.

Turning to FIG. 3, a wiring schematic of the common transformer 28 is shown wired to the PFC module 24, the high-voltage DC circuit 32, and the low-voltage DC circuit 34. Terminals 1 and 2 can represent the AC winding 38, which may be electrically connected to the PFC module 24 and ultimately receive electrical current induced by the AC circuit 30. Terminals 3-4 and 5-6 may include two windings representing the high-voltage DC winding 40 electrically connected in parallel with each other to the high-voltage DC circuit 32 as a full-wave rectifier configuration. Terminals 7-8-9, 10-11-12, 13-14-15, and 16-17-18 can represent the low-voltage DC winding 46 and be electrically connected to the low-voltage DC circuit 34 as eight paralleled windings having a center tapped configuration.

An implementation of the common transformer is shown in FIGS. 4-7. The AC winding 38, the high-voltage DC winding 40, and the low-voltage DC winding 46 can each be implemented as planar winding laid flat on a surface of a printed circuit board (PCB) assembly 60. The common transformer 28 can include a transformer core 48 having a central post 50 and a plurality of perimeter posts 52 for receiving windings. The transformer core 48 can be made of a ferromagnetic material as is known. The AC winding 38 and the high-voltage DC winding 40 can both encircle the central post 50 of the transformer core 48 whereas the low-voltage DC winding 46 ca encircle four perimeter posts 52 that are radially, outwardly spaced from the central post 50. The particular ratio of turns of the AC winding 38, the high-voltage DC winding 40, and the low-voltage DC winding 46 can be 16:8:0.25 turns for the AC circuit 30, the high-voltage DC circuit 32, and the low-voltage DC circuit 34, respectively. More particularly, the particular ratio can be modified to 16:8:1 by using a winding for the low-voltage DC winding 46 that encircles each of four perimeter posts 52. In some implementations, the AC winding 38 can comprise windings of litz wires. In other implementations, the AC winding 38, as well as the high-voltage DC winding 40 and the low-voltage DC winding 46 can be implemented using planar metal conductors. These planar metal conductors can be sandwiched as part of a PCB stackup or PCB assembly 60. The central post 50 can have a circular cross-sectional shape whereas the perimeter posts 52 can include an arcuate portion 54 along with a plurality of linear portions 56. A transformer cover 58 can engage with and couple to the transformer core 48 at each of the four perimeter posts 52 such that the transformer cover 58 faces one side of the PCB assembly 60 and the transformer core faces another side of the PCB assembly 60. The transformer cover 58 can be made of a material that is similar to the material used for the transformer core 48. The assembled transformer core 48 and transformer cover 58 can be fixedly attached to a heat sink, such as a metal plate 62. The metal plate 62 can be constructed from any one of a number of suitable metals, such as aluminum. The particular dimensions of the transformer core 48 can be determined based on the desired electrical performance of the common transformer 28.

For example, electrical performance such as the DC resistance of a winding can be determined using the following formula:

$$R_{dc} = \frac{\rho \cdot 2 \cdot \pi}{h} \cdot \frac{1}{\ln\left(\frac{R}{r}\right)} = \frac{k}{\ln\left(\frac{R}{r}\right)}$$

Figure 8:
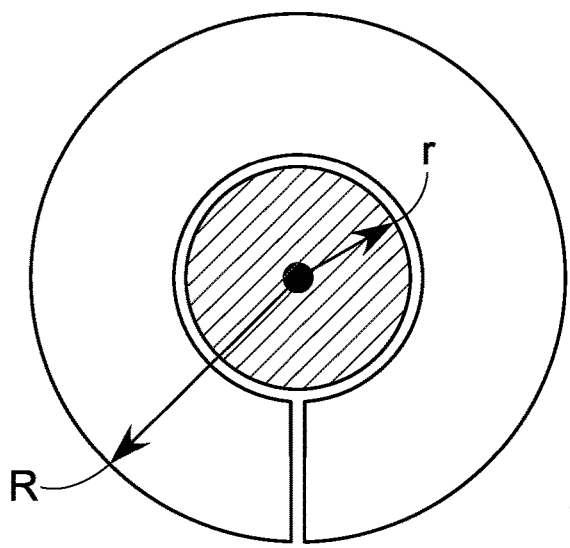
FIG. 8 is a plan view of a portion of an electrical winding capable of use with the common inverter.
Figure 9:
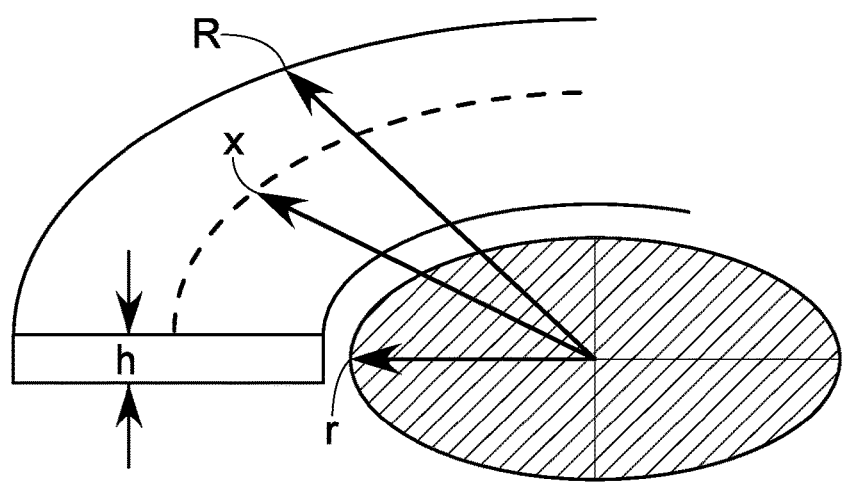
FIG. 9 is a partial cross-sectional view of a portion of an electrical winding capable of use with the common inverter.
Figure 10:
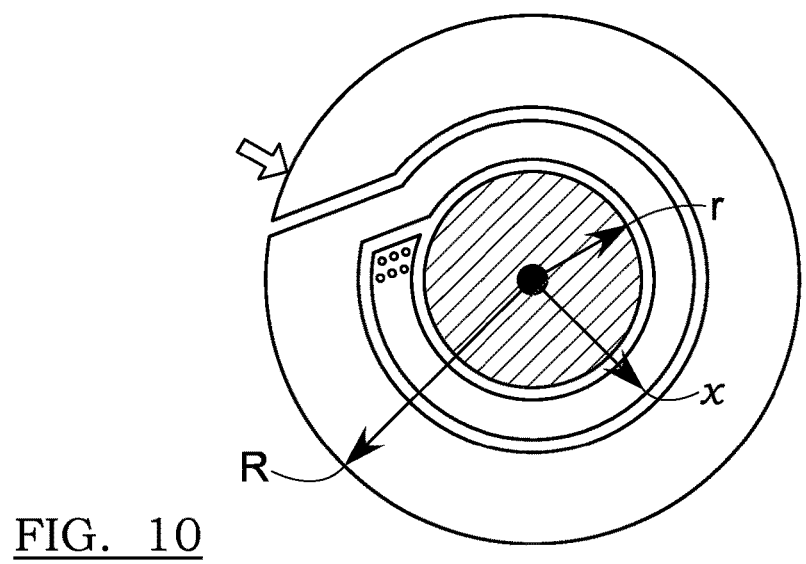
FIG. 10 is a plan view of a portion of another electrical winding capable of use with the common inverter.

Height of the winding is represented by h, r is the radius from the center of the central post 50 to an inner diameter of the winding, and R is the radius from the center of the central post 50 to the outer diameter of the winding. A graphic representation of this is shown in FIGS. 8-9. Another graphic representation of the DC resistance calculation is shown in FIG. 10 involving two turns of a winding. The equation used for two turns of a winding is:

$$R_{dc1} = \frac{k}{\ln\left(\frac{x}{r}\right)}$$

$$R_{dc2} = \frac{k}{\ln\left(\frac{R}{x}\right)}$$

$$R_{tot} = R_{dc1} + R_{dc2}$$

The minimum value of the total resistance is calculated using the Fermat formula:

$$\frac{d}{dx} R_{tot}(x) = 0$$

$$\frac{d}{dx}\left(\frac{k}{\ln\left(\frac{x}{r}\right)} + \frac{k}{\ln\left(\frac{R}{x}\right)}\right) = 0$$

$$\frac{k}{x \cdot \ln\left(\frac{x}{r}\right)^2} + \frac{k}{R \cdot \ln\left(\frac{R}{x}\right)} = 0 \rightarrow x = \sqrt{r \cdot R}$$

The calculated width can depend on the ratio between the cross-sectional area of the central post 50 and the maximum available space for the central post 50.

Replacing the result in $R_{dc1}$ and $R_{dc2}$ yields:

$$R_{tot} = R_{dc1} + R_{dc2}$$

$$= \frac{k}{\ln\left(\frac{x}{r}\right)} + \frac{k}{\ln\left(\frac{R}{x}\right)}$$

$$= \frac{k}{\ln\left(\frac{\sqrt{r \cdot R}}{r}\right)} + \frac{k}{\ln\left(\frac{R}{\sqrt{r \cdot R}}\right)}$$

$$= \frac{k}{\ln\left(\sqrt{\frac{R}{r}}\right)} + \frac{k}{\ln\left(\sqrt{\frac{R}{r}}\right)}$$

$$= \frac{2 \cdot k}{\ln\left(\sqrt{\frac{R}{r}}\right)}$$

$$= \frac{2 \cdot k}{\frac{1}{2}\ln\left(\sqrt{\frac{R}{r}}\right)}$$

$$= \frac{4 \cdot k}{\ln\left(\sqrt{\frac{R}{r}}\right)}$$

Figure 11:
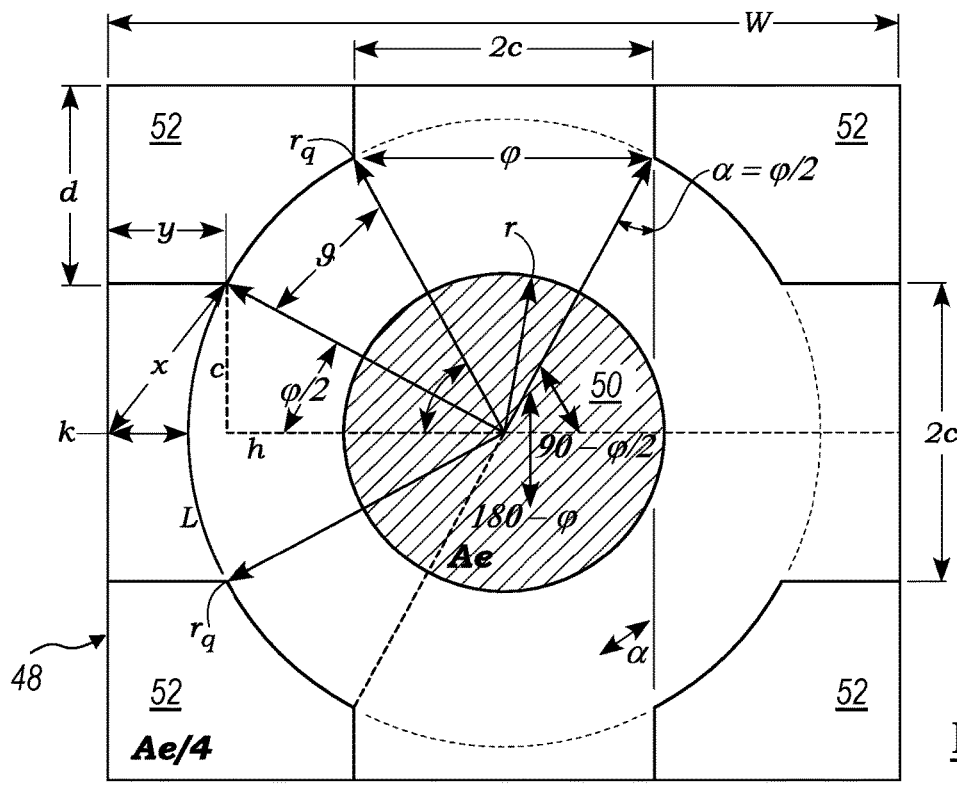
FIG. 11 is a plan view depicting a portion of an implementation of a common inverter.
Figure 12:
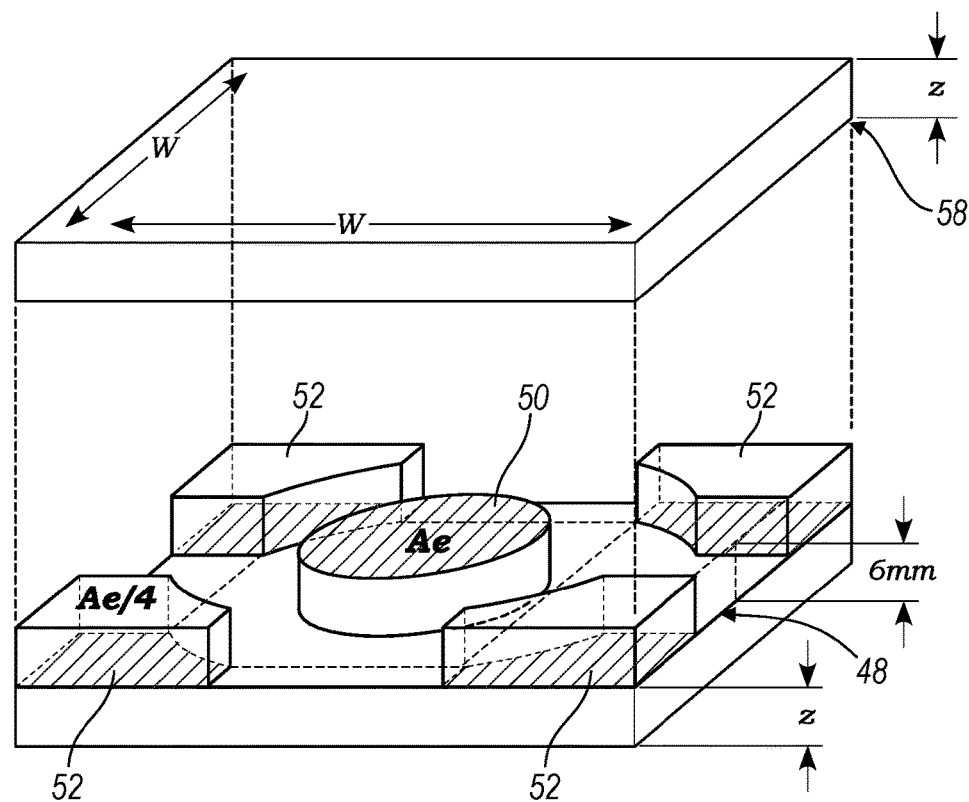
FIG. 12 is a perspective view of an implementation of a common transformer.

Minimum resistance can be achieved if $R_{dc1}$ and $R_{dc2}$ equal the same value. An example of a common transformer 28 that has a particular size include the central post 50 and perimeter posts 52 that are shaped and sized according to particular principles is shown with respect to FIGS. 11-12 and discussed below. The common inductor 28 in this implementation includes an inductor core and is size 6 millimeters (mm) long, 6 mm wide, and 2.4 mm high. The volume of the transformer core 48 can be estimated using the Standex Planar Magnetics Design guide.

Another implementation of the common transformer 28' is shown in FIGS. 13-15. The transformer core 48 is shown along with layers comprising the AC winding 38, the high-voltage DC winding 40, and the low-voltage DC winding 46 sandwiched between the transformer core 48 and the transformer cover 58. The transformer core 48 is shown at the bottom and a first low-voltage layer 62 including a portion of the low-voltage DC winding 46 that engages at least a portion of the perimeter posts 52 is placed on the transformer core 48. A ground layer 64 is stacked on top of the first low-voltage layer 62 and two central layers 66 that collectively include the AC winding 38 and the high-voltage DC winding 40 are stacked on top of the ground layer 64. Another ground layer 64 is laid on top of the central layers 66 followed by a second low-voltage layer 68 that includes a portion of the low-voltage DC winding 46 and the transformer cover 58. Each central layer 66 can include eight turns of wire that are wired together in parallel, whereas the low-voltage DC layers 62, 64 can abut the perimeter posts and each collectively implement one full turn of winding such that the layers 62, 64 are wired in parallel. The layers 62, 66, 68 can be implemented as layers within a PCB stackup or assembly 60 such that switches 70 for each circuit are mounted on an external surface 72 of the PCB assembly 60 and electrically couple with the layers within the PCB substrate. The transformer core 48 can face one side of the PCB assembly 60 and the transformer cover 58 can face an opposite side of the PCB assembly 60. The general planar shape of the common transformer windings can provide a lower profile than conventional wire wound components thereby implementing inductors in a more compact package. The height of a planar inductor can be one quarter to one half of a wire-wound implementation. The planar shape can increase power density and distribution of generated heat. The planar inductor core may have a higher surface area to volume ratio than previous inductor cores. Planar shaped inductors can facilitate the integration of switches along with the windings as one package, such that the switches are carried by a PCB having layers with the windings. And the PCB layers can facilitate interconnecting the layers through vias thereby interleaving the windings. This can reduce inductance leakage and high-frequency winding losses. Further, planar magnetics can reduce the parasitic loss of the inductors.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A common transformer used with an electric vehicle, comprising:
   a transformer core configured to receive electrical windings from a plurality of electrical circuits;
   an alternating current (AC) synchronous rectification (SR) circuit electrically connected to the transformer core via an AC winding;
   a high-voltage SR circuit electrically connected to the transformer core via a high-voltage DC winding; and
   a low-voltage SR circuit electrically connected to the transformer core via a low-voltage DC winding, wherein the transformer core comprises a central post and one or more perimeter posts and the low-voltage DC winding is electrically connected to each of the perimeter posts.

2. The common transformer recited in claim 1, wherein electric power is communicated bi-directionally between the AC SR circuit and the high-voltage DC SR circuit.

3. The common transformer recited in claim 1, wherein electric power is communicated bi-directionally between the high-voltage DC SR circuit and the low-voltage DC SR circuit.

4. The common transformer recited in claim 1, wherein a turn ratio of the AC winding relative to the high-voltage DC winding and the low-voltage DC winding equals 16:8:1.

5. The common transformer recited in claim 1, wherein the central post has a circular cross-sectional shape and each of the perimeter posts includes an arcuate section.

6. The common transformer recited in claim 1, further comprising a printed circuit board (PCB) assembly that includes the AC winding, the high-voltage DC winding, the low-voltage DC winding, and one or more switches, wherein the switch(es) are mounted on an exterior surface of the PCB assembly.

7. The common transformer recited in claim 6, wherein the AC winding, the high-voltage DC winding, and the low-voltage DC winding are stacked within the PCB assembly between ground layers.

8. The common transformer recited in claim 1, wherein the AC winding comprises Litz wires.

9. A common transformer used with an electric vehicle, comprising:
   a transformer core configured to receive electrical windings from a plurality of electrical circuits;
   an alternating current (AC) synchronous rectification (SR) circuit electrically connected to the transformer core via an AC winding and configured to receive electrical power from an electrical grid;
   a high-voltage DC SR circuit electrically connected to the transformer core via a high-voltage DC winding and configured to receive electric power from a vehicle battery; and
   a low-voltage DC SR circuit electrically connected to the transformer core via a low-voltage DC winding, wherein the high-voltage AC winding, the high-voltage DC winding, or the low-voltage DC winding comprise a planar metal conductor.

10. The common transformer recited in claim 9, wherein electric power is communicated bi-directionally between the AC SR circuit and the high-voltage DC SR circuit.

11. The common transformer recited in claim 9, wherein electric power is communicated bi-directionally between the high-voltage SR circuit and the low-voltage DC SR circuit.

12. The common transformer recited in claim 9, wherein the turn ratio of the AC winding relative to the high-voltage DC winding and the low-voltage DC winding equals 16:8:1.

13. The common transformer recited in claim 9, wherein the transformer core comprises a central post and one or more perimeter posts.

14. The common transformer recited in claim 13, wherein the central post has a circular cross-sectional shape and each of the perimeter posts includes an arcuate portion.

15. A common transformer used with an electric vehicle, comprising:
   a transformer core comprising a central post and one or more perimeter posts that are radially outwardly spaced apart from the central post, each of which is configured to receive electrical windings from electrical circuits;
   an alternating current (AC) synchronous rectification (SR) circuit electrically connected to the central post via an AC winding;
   a high-voltage DC SR circuit electrically connected to the central post via a high-voltage DC winding; and
   a low-voltage DC SR circuit electrically connected to all of the perimeter posts via a low-voltage DC winding.

16. The common transformer recited in claim 15, wherein electric power is communicated hi-directionally between the AC SR circuit and the high-voltage DC SR circuit.

17. The common transformer recited in claim 15, wherein electric power is communicated hi-directionally between the high-voltage DC SR circuit and the low-voltage DC SR circuit.

18. The common transformer recited in claim 15, wherein the turn ratio of the AC winding relative to the high-voltage DC winding and the low-voltage DC winding equals 16:8:1.

* * * * *